United States Patent
Johnson, Jr. et al.

(10) Patent No.: US 11,056,908 B2
(45) Date of Patent: *Jul. 6, 2021

(54) UNINTERRUPTIBLE POWER SUPPLY SYSTEMS AND METHODS USING ISOLATED INTERFACE FOR VARIABLY AVAILABLE POWER SOURCE

(71) Applicant: Eaton Intelligent Power Limited, Dublin (IE)

(72) Inventors: Robert William Johnson, Jr., Raleigh, NC (US); Yu Liu, Milwaukee, WI (US); Bobby L. Compton, Raleigh, NC (US); Pasi S. Taimela, Wake Forest, NC (US); Robert C. Sebald, Raleigh, NC (US)

(73) Assignee: Eaton Intelligent Power Limited

( * ) Notice: Subject to any disclaimer, the term of this patent is extended or adjusted under 35 U.S.C. 154(b) by 78 days.

This patent is subject to a terminal disclaimer.

(21) Appl. No.: 16/266,190

(22) Filed: Feb. 4, 2019

(65) Prior Publication Data
US 2020/0006978 A1   Jan. 2, 2020

Related U.S. Application Data

(63) Continuation of application No. 15/271,709, filed on Sep. 21, 2016, now Pat. No. 10,199,858, which is a
(Continued)

(51) Int. Cl.
*H02J 9/06* (2006.01)
*H02J 3/38* (2006.01)
*H02J 7/00* (2006.01)

(52) U.S. Cl.
CPC .............. *H02J 9/061* (2013.01); *H02J 3/382* (2013.01); *H02J 3/383* (2013.01); *H02J 3/386* (2013.01);
(Continued)

(58) Field of Classification Search
CPC .. H02J 3/381; H02J 3/382; H02J 3/383; H02J 3/386; H02J 7/007; H02J 9/061;
(Continued)

(56) References Cited

U.S. PATENT DOCUMENTS 5,929,538 A  7/1999 O'Sullivan et al.
6,134,124 A  10/2000 Jungreis et al.
(Continued)

FOREIGN PATENT DOCUMENTS

CN   101534013 A   9/2009
CN   101651355 A   2/2010
(Continued)

OTHER PUBLICATIONS

Chinese First Office Corresponding to Chinese Patent Application No. 201280056087.3; dated Dec. 31, 2015; Foreign Text: 10 Pages, English Translation Thereof, 10 Pages.
(Continued)

*Primary Examiner* — Rexford N Barnie
*Assistant Examiner* — Toan T Vu
(74) *Attorney, Agent, or Firm* — Stanek Lemon Crouse & Meeks, P.A.

(57) ABSTRACT

An uninterruptible power supply (UPS) system includes a first port configured to be coupled to an AC power source and a second port configured to be coupled to a load. The system also includes a UPS circuit including a first converter circuit coupled to the first port, a second converter circuit coupled to the second port and a DC bus coupling the first converter circuit to the second converter circuit and configured to be coupled to an auxiliary power source and a third converter circuit coupled to the second port and configured to receive power from a variably available power source. The system further includes a control circuit operatively associated with the UPS circuit and the third converter
(Continued)

circuit and configured to cooperatively control the UPS circuit and the third converter circuit to selectively transfer power to the load from the AC power source and the variably available power source and from the variably available power source to the AC power source.

14 Claims, 8 Drawing Sheets

Related U.S. Application Data continuation of application No. 13/297,477, filed on Nov. 16, 2011, now abandoned, which is a continuation-in-part of application No. 12/779,522, filed on May 13, 2010, now abandoned.

(52) U.S. Cl.
CPC .............. *H02J 7/007* (2013.01); *H02J 9/062* (2013.01); *Y02B 10/70* (2013.01); *Y02E 10/56* (2013.01); *Y02E 10/76* (2013.01)

(58) Field of Classification Search
CPC .... H02J 9/062; H02J 2300/20; H02J 2300/24; H02J 2300/28; H02J 2300/40; Y02B 10/70; Y02E 10/56; Y02E 10/76; Y02P 80/10; Y02P 80/20
USPC ..................................................... 307/64–66
See application file for complete search history.

(56) References Cited

U.S. PATENT DOCUMENTS

| | | | |
|---|---|---|---|
| 6,160,722 A | 12/2000 | Thommes et al. | |
| 6,201,319 B1 | 3/2001 | Simonelli et al. | |
| 6,304,006 B1 | 10/2001 | Jungreis | |
| 6,404,075 B1 | 6/2002 | Potter et al. | |
| 6,787,259 B2 | 9/2004 | Colborn et al. | |
| 6,847,130 B1 | 1/2005 | Belehradek et al. | |
| 6,960,843 B2 | 11/2005 | Yamamto | |
| 7,050,312 B2 | 5/2006 | Tracy et al. | |
| 7,212,421 B2 | 5/2007 | Chandra et al. | |
| 7,265,458 B2 | 9/2007 | Edelen et al. | |
| 7,411,308 B2 | 8/2008 | Parmley | |
| 7,566,988 B2 | 7/2009 | Heber et al. | |
| 7,638,899 B2 | 12/2009 | Tracy et al. | |
| 7,652,393 B2 | 1/2010 | Moth | |
| 2004/0084965 A1 | 5/2004 | Welches et al. | |
| 2004/0145188 A1 | 7/2004 | Janssen et al. | |
| 2004/0240244 A1 | 12/2004 | Yamamoto | |
| 2005/0036253 A1 | 2/2005 | Tian et al. | |
| 2006/0192435 A1 | 8/2006 | Parmley | |
| 2006/0226706 A1* | 10/2006 | Edelen .................... H02J 9/062 307/64 |
| 2006/0290205 A1 | 12/2006 | Heber et al. | |
| 2007/0076444 A1 | 4/2007 | McNulty et al. | |
| 2007/0210652 A1 | 9/2007 | Tracy et al. | |
| 2007/0273210 A1 | 11/2007 | Wang et al. | |
| 2008/0030027 A1 | 2/2008 | Erdman et al. | |
| 2008/0111424 A1 | 5/2008 | Yeh | |
| 2008/0129120 A1 | 6/2008 | Su et al. | |
| 2008/0185915 A1 | 8/2008 | Wang | |
| 2008/0217998 A1 | 9/2008 | Parmley | |
| 2008/0278003 A1 | 11/2008 | Pouchet et al. | |
| 2009/0009001 A1 | 1/2009 | Marwali et al. | |
| 2009/0072623 A1* | 3/2009 | Liao ...................... H02J 9/061 307/65 |
| 2009/0085404 A1 | 4/2009 | Suzuki et al. | |
| 2009/0230772 A1 | 9/2009 | Caudill | |
| 2009/0284074 A1 | 11/2009 | Yeh | |
| 2010/0198421 A1 | 8/2010 | Fahimi | |
| 2010/0207448 A1 | 8/2010 | Cooper et al. | |
| 2011/0043160 A1* | 2/2011 | Serban .................... H02M 1/44 320/101 |
| 2011/0115295 A1* | 5/2011 | Moon ...................... H02J 3/382 307/65 |
| 2012/0217824 A1 | 8/2012 | Gupta et al. | |

FOREIGN PATENT DOCUMENTS

| | | |
|---|---|---|
| CN | 101689812 A | 3/2010 |
| CN | 101951013 A | 1/2011 |
| EP | 1 710 890 A2 | 10/2006 |
| EP | 1 965 487 A1 | 2/2007 |
| EP | 1 841 051 A2 | 10/2007 |
| EP | 1 986 306 A1 | 10/2008 |
| JP | 2000-201440 A | 7/2000 |
| WO | WO 2006/026549 | 3/2006 |

OTHER PUBLICATIONS

Chinese Notification of Rejection Corresponding to Patent Application No. 201180023771.7; Date of Notification: Apr. 1, 2016; 11 Pages.
Chinese Second Office Action Corresponding to Chinese Patent Application No. 201280056087.3; Date of Notification: Jul. 25, 2016; Foreign Text, 10 Pages, English Translation Thereof, 10 Pages.
International Preliminary Report on Patentability Corresponding to International Application No. PCT/US2012/065267; dated May 30, 2014; 8 Pages.
International Search Report and Written Opinion Corresponding to International Application No. PCT/IB2011/001028; dated Oct. 14, 2011; 13 pages.
International Search Report and Written Opinion Corresponding to International Application No. PCT/US2012/065267; dated Mar. 25, 2013; 11 Pages.
Jayasimha et al.; *Photovoltaic UPS*; IEEE Tencon 2003 Conference on Convergent Technologies for Asia-Pacific Region, vol. 4, pp. 1419-1423 (2003).
International Search Report and Written Opinion Corresponding to International Application No. PCT/IB2011/001024; dated Jul. 5, 2012; 14 pages.
Notification of Third Office Action, Chinese Patent Application No. 201180023771.7; dated Nov. 30, 2015; 11 Pages.

* cited by examiner

UNINTERRUPTIBLE POWER SUPPLY SYSTEMS AND METHODS USING ISOLATED INTERFACE FOR VARIABLY AVAILABLE POWER SOURCE

CROSS-REFERENCE TO RELATED APPLICATIONS

The present application is a continuation of U.S. patent application Ser. No. 15/271,709; filed Sep. 21, 2016 (which will issue as U.S. Pat. No. 10,199,858 on Feb. 5, 2019), which is a continuation of U.S. patent application Ser. No. 13/297,477; filed Nov. 16, 2011, which is a continuation-in-part of U.S. patent application Ser. No. 12/779,522; filed May 13, 2010, the disclosures of which are hereby incorporated herein by reference in their entireties.

BACKGROUND

The inventive subject matter relates to power supply systems and methods and, more particularly, to uninterruptible power supply (UPS) systems and methods.

Data centers, industrial facilities, medical facilities and the like often have AC power distribution systems that are protected by UPS systems. UPS systems may be used in such applications to provide backup power to maintain operation in event of failure of the primary utility supply. UPS systems commonly have an "on-line" configuration including a rectifier and inverter coupled by a DC link that is also coupled to an auxiliary source, such as a battery, flywheel converter or other energy storage device. In some UPS applications, a renewable source, such as a photovoltaic source, may be coupled to the DC link of an on-line UPS to provide supplemental power, as described, for example, in U.S. Pat. No. 7,411,308 to Parmley and an article entitled "Photovoltaic UPS" by Jayasimha et al., IEEE TENCON 2003 Conference on Convergent Technologies for Asia-Pacific Region, vol. 4, pp. 1419-1423 (2003).

SUMMARY

Some embodiments of the inventive subject matter provide uninterruptible power supply (UPS) systems. A UPS system according to some embodiments includes a first port configured to be coupled to an AC power source and a second port configured to be coupled to a load. The system also includes a UPS circuit including a first converter circuit coupled to the first port, a second converter circuit coupled to the second port and a DC bus coupling the first converter circuit to the second converter circuit and configured to be coupled to an auxiliary power source and a third converter circuit coupled to the second port and configured to receive power from a variably available power source. The system further includes a control circuit operatively associated with the UPS circuit and the third converter circuit and configured to cooperatively control the UPS circuit and the third converter circuit to selectively transfer power to the load from the AC power source and the variably available power source and from the variably available power source to the AC power source.

In further embodiments, the UPS circuit and the third converter may be implemented in respective first and second power conversion modules, each of the first and second power conversion modules including a pair of converter units coupled by a DC bus. The DC bus of the second power conversion module may be configured to be coupled to the variably available power source. The control circuit may be configured to selectively transfer power from the variably available power source to the AC power source via the UPS circuit.

In some embodiments, the DC bus includes a first DC bus and the UPS system may further include a second DC bus configured to be coupled to the variably available power source and a fourth converter circuit coupled to the first port and to the third converter circuit by the second DC bus. The control circuit may be operatively associated with the fourth converter circuit and configured to selectively transfer power from the variably available power source to the AC power source via the fourth converter circuit.

In further embodiments, a UPS system includes a first port configured to be coupled to an AC power source and a second port configured to be coupled to a load. The system also includes a plurality of power conversion modules, each including a first converter unit, a second converter unit and a DC bus coupling the first converter unit to the second converter unit. The second converter units of the power conversion modules are coupled in common to the second port. A first converter unit of a first one of the power conversion modules is coupled to the first port. The DC bus of the first one of the power conversion modules is coupled to an auxiliary power source, and the DC bus of a second one of the power conversion modules is coupled to a variably available power source. The system further includes a control circuit operatively associated with the plurality of power conversion modules and configured to cause the power conversion modules to selectively transfer power to the load from the AC power source and the variably available power source and from the variably available power source to the AC power source.

In some embodiments, each of the power conversion modules may include a DC bus interface unit. The DC bus interface unit of the second one of the power conversion modules may be configured to couple the DC bus of the second one of the power conversion modules to the variably available power source. The second converter units of the power conversion modules may be configured to operate as inverters and the first converter unit of the first power conversion module may be configured to operate as a rectifier. The control circuit may be configured to cause transfer of power from the variably available power source to the auxiliary power source and/or the AC power source via the second converter unit of the first one of the power conversion modules. In some embodiments, the first converter unit of the second one of the power conversion modules may be coupled to the first port and the control circuit may be configured to cause transfer of power from the variably available power source to the AC power source via the first converter unit of the second one of the power conversion modules.

In some method embodiments, a UPS system is populated with a plurality of power conversion modules, each including a first converter unit, a second converter unit and a DC bus coupling the first converter unit to the second converter unit. The second converter units of the power conversion modules are coupled in common to the second port. A first converter unit of a first one of the power conversion modules is coupled to an AC power source. The DC bus of a second one of the power conversion modules is coupled to a variably available power source. Power is selectively transferred to the load from the AC power source and the variably available power source and from the variably available power source to the AC power source.

DETAILED DESCRIPTION OF EXEMPLARY EMBODIMENTS

Figure 1:
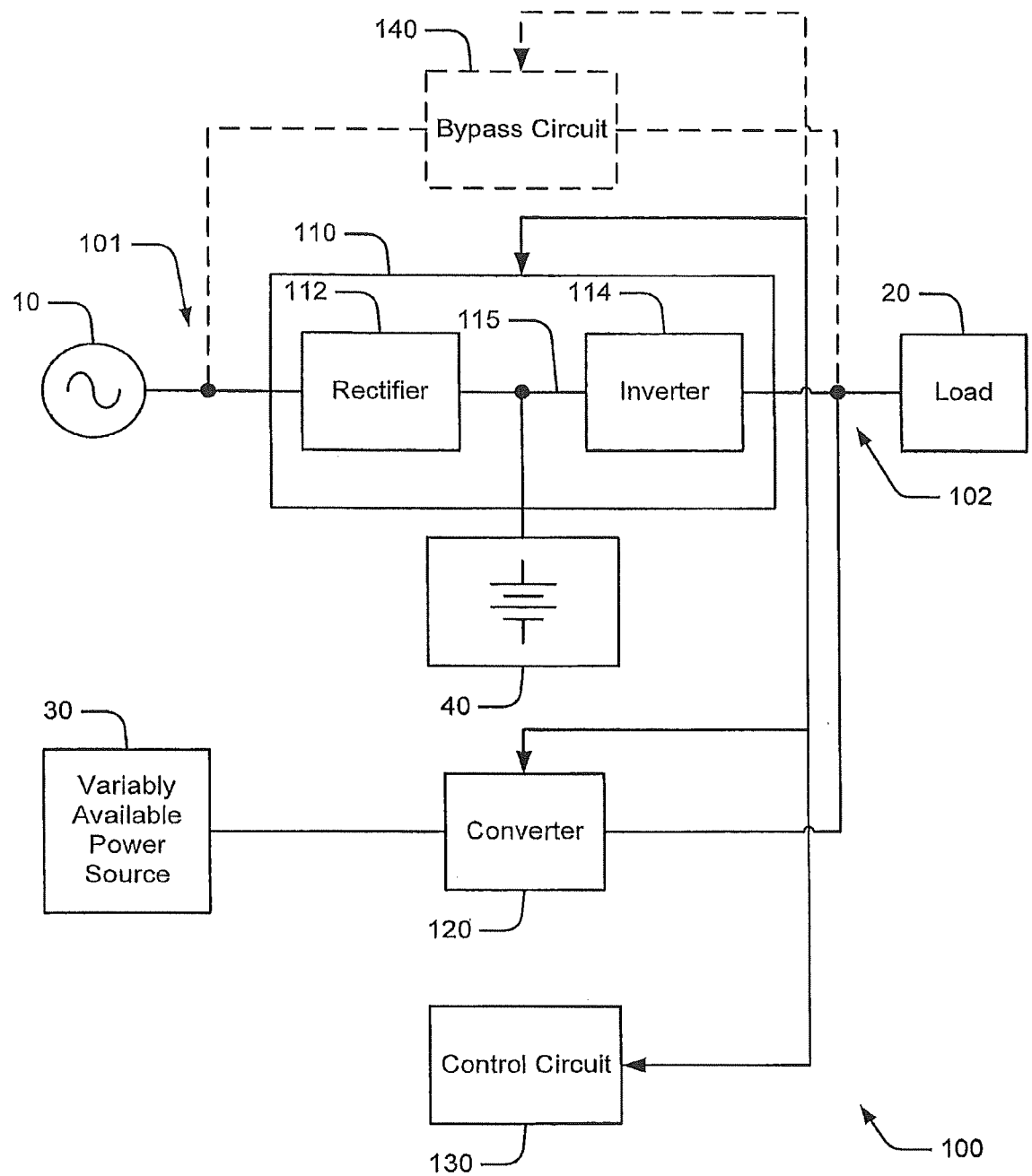
FIG. 1 is a schematic diagram illustrating a UPS system according to some embodiments of the inventive subject matter.

Specific exemplary embodiments of the inventive subject matter now will be described with reference to the accompanying drawings. This inventive subject matter may, however, be embodied in many different forms and should not be construed as limited to the embodiments set forth herein; rather, these embodiments are provided so that this disclosure will be thorough and complete, and will fully convey the scope of the inventive subject matter to those skilled in the art. In the drawings, like numbers refer to like elements. It will be understood that when an element is referred to as being "connected" or "coupled" to another element, it can be directly connected or coupled to the other element or intervening elements may be present. As used herein the term "and/or" includes any and all combinations of one or more of the associated listed items.

The terminology used herein is for the purpose of describing particular embodiments only and is not intended to be limiting of the inventive subject matter. As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this inventive subject matter belongs. It will be further understood that terms, such as those defined in commonly used dictionaries, should be interpreted as having a meaning that is consistent with their meaning in the context of the specification and the relevant art and will not be interpreted in an idealized or overly formal sense unless expressly so defined herein.

As will be appreciated by one of skill in the art, the inventive subject matter may be embodied as systems, methods and computer program products. Some embodiments of the inventive subject matter may include hardware and/or combinations of hardware and software. Some embodiments of the inventive subject matter include circuitry configured to provide functions described herein. It will be appreciated that such circuitry may include analog circuits, digital circuits, and combinations of analog and digital circuits.

Embodiments of the inventive subject matter are described below with reference to block diagrams and/or operational illustrations of systems and methods according to various embodiments of the inventive subject matter. It will be understood that each block of the block diagrams and/or operational illustrations, and combinations of blocks in the block diagrams and/or operational illustrations, can be implemented by analog and/or digital hardware, and/or computer program instructions. These computer program instructions may be provided to a processor of a general purpose computer, special purpose computer, ASIC, and/or other programmable data processing apparatus, such that the instructions, which execute via the processor of the computer and/or other programmable data processing apparatus, create means for implementing the functions/acts specified in the block diagrams and/or operational illustrations. In some implementations, the functions/acts noted in the figures may occur out of the order noted in the block diagrams and/or operational illustrations. For example, two operations shown as occurring in succession may, in fact, be executed substantially concurrently or the operations may sometimes be executed in the reverse order, depending upon the functionality/acts involved.

Some embodiments of the inventive subject matter relate to interfacing of variably available power sources with UPSs. As referred to herein, "variably available power sources" include power sources, such as solar, wind, tidal and similar renewable energy sources, having an availability (e.g., presence and capacity) that fluctuates with environmental conditions (e.g., availability of wind, sun or tidal change) and that are not, as a general rule, available on demand. Such power sources may also be referred to as "variable", "intermittent" or "non-dispatchable" and, for purposes of the present application, such sources shall be referred to as "variably available power sources."

Some embodiments of the inventive subject matter arise from a realization that the DC link bus can be a critical point in the UPS architecture. Failure of a variably available power source, such as a photovoltaic array, coupled to the DC link can potentially impact the output of the UPS and/or reduce system robustness and reliability. Some embodiments of the inventive subject matter may address such issues by using a variably available power source interface circuit comprising a converter having an output coupled to the AC output and an input configured to receive power from a variably available power source. In some UPS system embodiments, for example, generic power conversion modules may be configured to include one or more modules configured to provide online-UPS functions, output-paralleled with one or more modules configured to provide a variably available power source interface for the UPS system. In this manner, isolation between the variably available power source and DC bus of the UPS module(s) may be provided. In addition, modules may be selectively configured for use as UPS modules or variably available power source interfaces depending on the relative capacities and requirements of the system. In further embodiments, power may be transferred from the variably available power source to an auxiliary power source coupled to a UPS and/or to an AC power source (e.g., a utility source) that provides power to a UPS.

FIG. 1 illustrates a UPS system 100 according to some embodiments of the inventive subject matter. The UPS system 100 includes a UPS circuit 110 including a first converter circuit, e.g., a rectifier 112, and a second converter circuit, e.g., an inverter 114, coupled by a DC link 115. An auxiliary power source 40, e.g., one or more batteries, may be coupled to the DC link 115. The input of the rectifier 112 is coupled to an AC input 101 of the UPS system, and the output of the inverter 114 is coupled to an AC output 102 of the UPS system 100. The UPS circuit 110 is configured to provide uninterruptible power to a load 20 coupled to the AC output 102 from an AC power source 10 (e.g., a utility source and/or local generator) coupled to the AC input 101 and from the auxiliary power source 40, which may provide power in the event of a failure of the AC source 10. The UPS system 100 may also include a bypass circuit 140 (e.g., a static switch), which may be used to bypass the UPS circuit 110 to provide power directly from the AC power source 10 to the load 20, which may support maintenance and high-efficiency modes of operation. It will be appreciated that the UPS system 100 may be a single-phase or multiphase (e.g., three-phase) system.

The UPS system 100 further comprises a third converter circuit 120, coupled between the AC output 102 and a variably available power source 30, such as a solar or wind power source. A control circuit 130 is operatively associated with the UPS circuit 110 and the converter circuit 120 (and, optionally, the bypass circuit 140) and is configured to cooperatively control the UPS circuit 110 and the converter circuit 120 to selectively transfer power to the load 20 from the AC power source 10 and the variably available power source 30.

Figure 2:
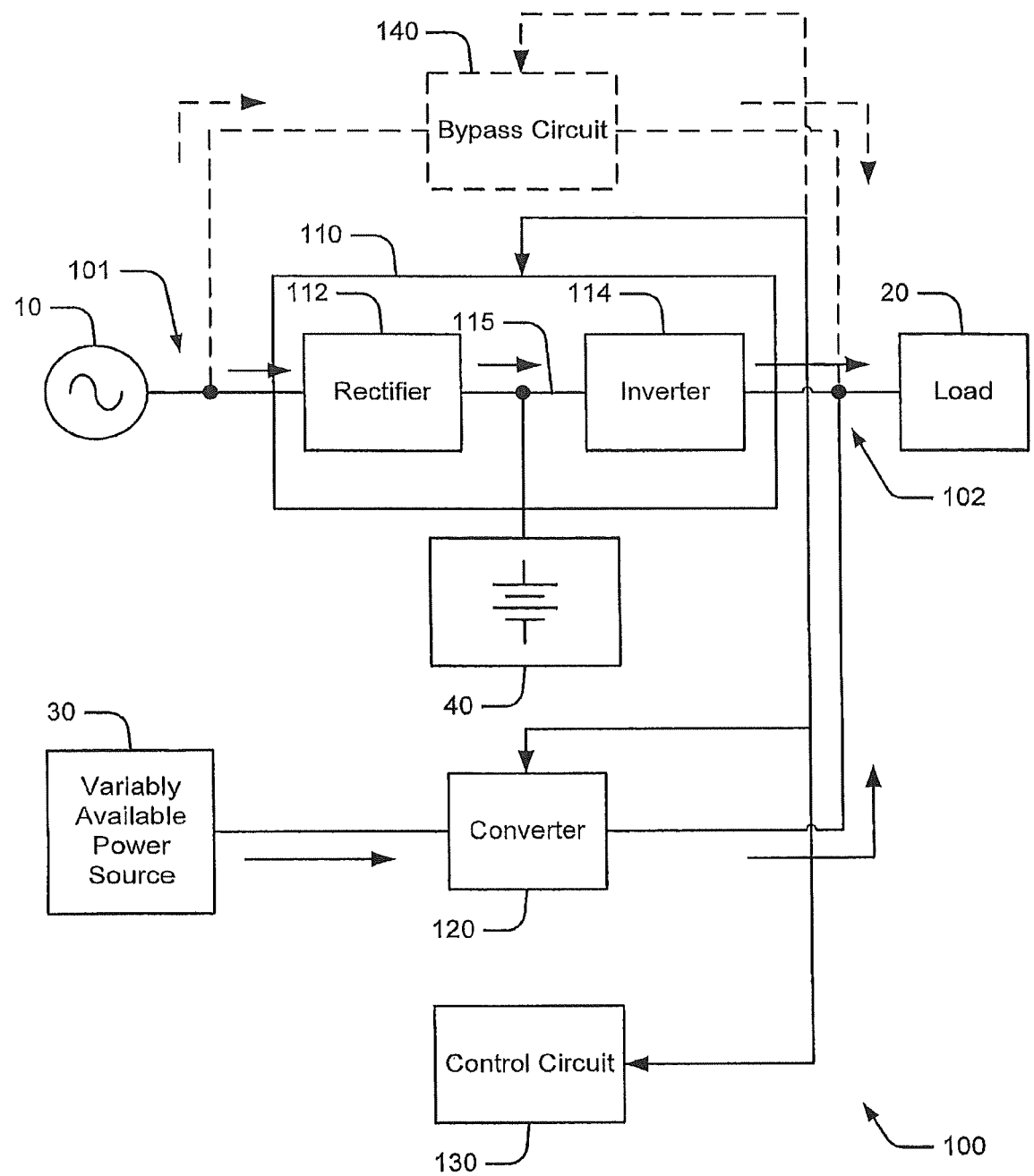
FIGS. 2 and 3 are schematic diagram illustrating operations of the UPS system of FIG. 1.
Figure 3:
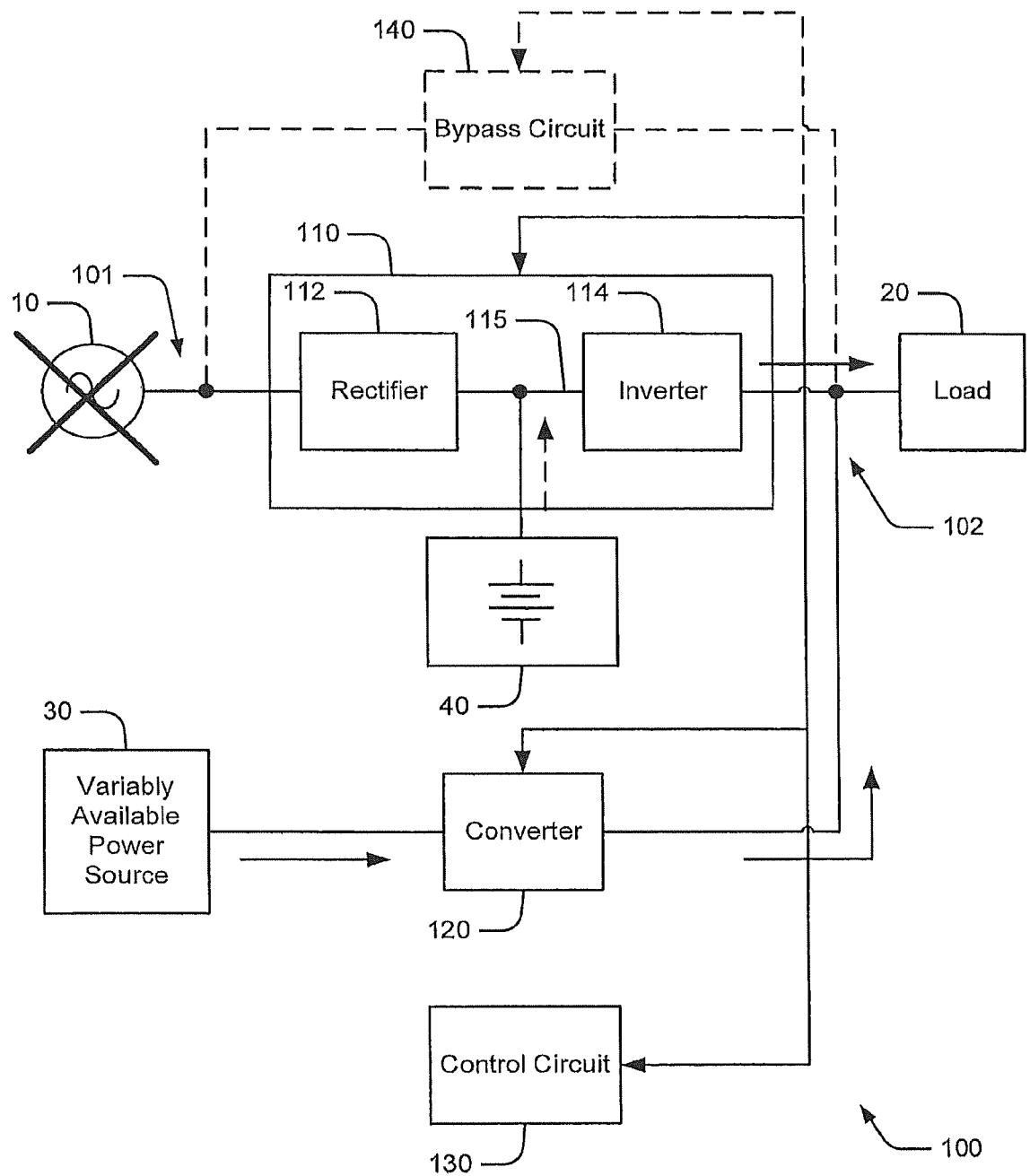

For example, as illustrated in FIG. 2, when the AC power source 10 is producing power in manner meeting predetermined criteria, power may be provided to the load 20 from the AC power source 10 through the rectifier 112 and inverter 114 (and/or via the bypass circuit 140), while power is concurrently transferred to the load 20 from the variably available power source 30 via the converter 120. As shown in FIG. 3, upon failure of the AC power source 10, the control circuit 130 may operate the inverter 114 of the UPS circuit 110 and the converter 120 such that power is concurrently delivered to the load 20 from the variably available power source 30 and the auxiliary power source 40.

It will be appreciated that the above-described components of the UPS system 100 may be integrated in one assembly or may implemented using multiple interoperating assemblies with connecting power and control links.

Figure 4:
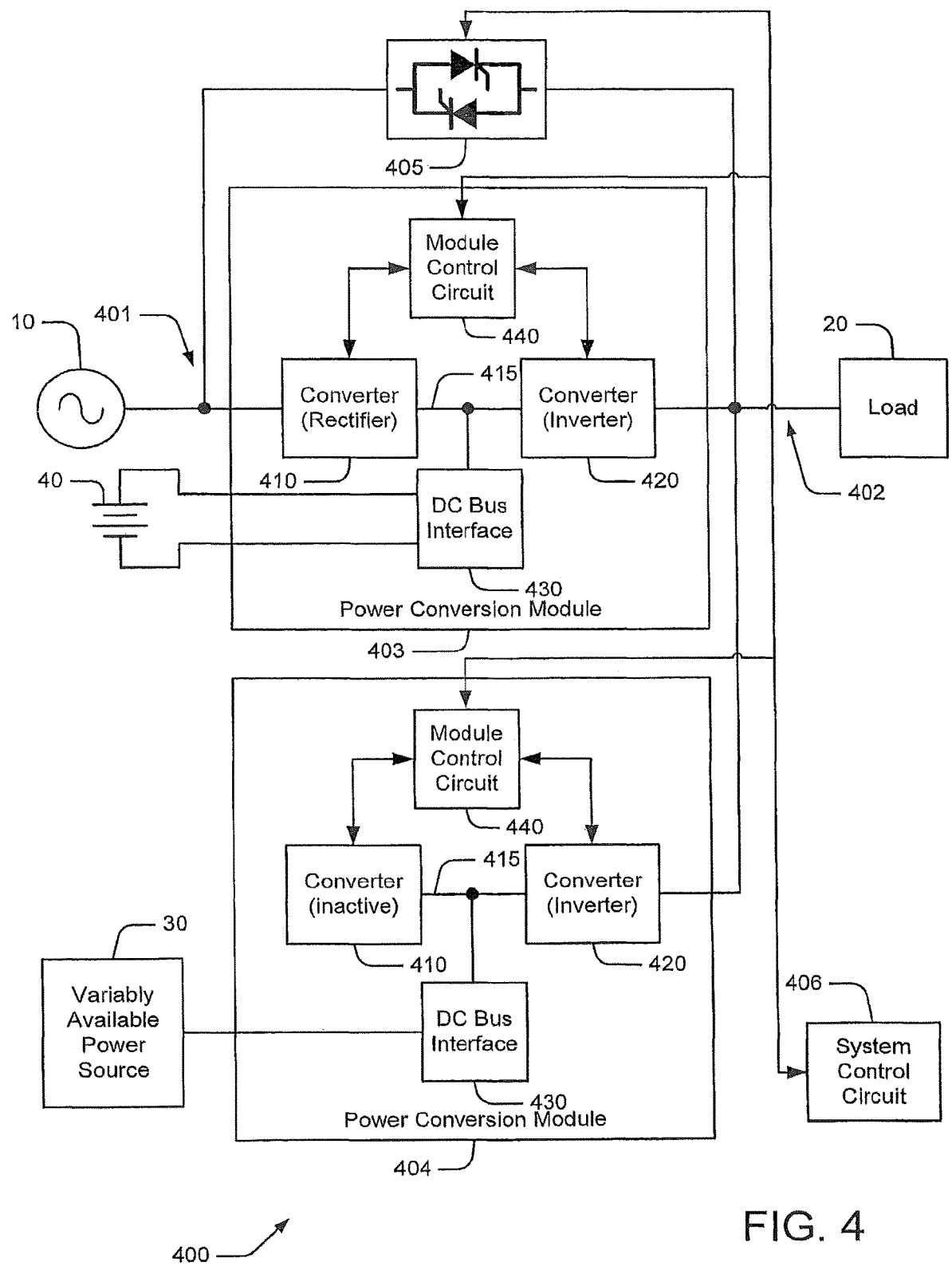
FIG. 4 is a schematic diagram illustrating a modular UPS system according to some embodiments of the inventive subject matter.

FIG. 4 illustrates a modular UPS system 400 with a variably available power source interface capability according to further embodiments of the inventive subject matter. The UPS system 400 includes an AC input 401 configured to be coupled to an AC power source 10 and an AC output 402 configured to be coupled to a load 20. The UPS system 400 further includes first and second power conversion modules 403, 404 having a common architecture, including a first converter unit 410 and a second converter unit 420 coupled by a DC bus 415, a DC bus interface unit 430 and a module control circuit 440 configured to control the first converter unit 410, the second converter unit 420 and/or the DC bus interface unit 430. A system control circuit 406 controls interoperation of the first and second power conversion modules 403, 404 and a bypass circuit 405.

The first power conversion module 403 is configured to provide a UPS function. In particular, the first module 403 is configured to operate the first converter unit 410 as a rectifier to produce a DC voltage on the DC bus 415 from the AC power source 10. In some embodiments, the first converter units 410 may comprise passive rectifiers while, in other embodiments, the first converter units 410 may be active circuits that may be used to implement a rectifier function, but that are selectively reconfigurable to provide other conversion operations, such as DC/DC conversion, by, for example, changing the manner in which the active circuits are controlled. The first module 403 is further configured to operate the second converter unit 420 as an inverter to produce an AC voltage at the AC output 402. The DC bus interface unit 430 of the first module 403 provides an interface to one or more batteries 40, which may be used to provide auxiliary power in the event of a failure of the AC power source 10.

The second power conversion module 404 is configured differently to provide an interface to a variably available power source 30 (e.g., wind, solar, tidal, etc.). The second converter unit 420 of the second module 404 is operated as an inverter. The first converter unit 410, however, is inactive. The variably available power source 30 is coupled to the DC bus 415 using the DC bus interface unit 430. Depending on the nature of the variably available power source 30, the DC bus interface unit 430 may simply connect the variably available power source 30 to the DC bus 415 without a voltage conversion, or the DC bus interface unit 430 may provide, for example, a DC/DC or AC/DC conversion function.

Figure 5:
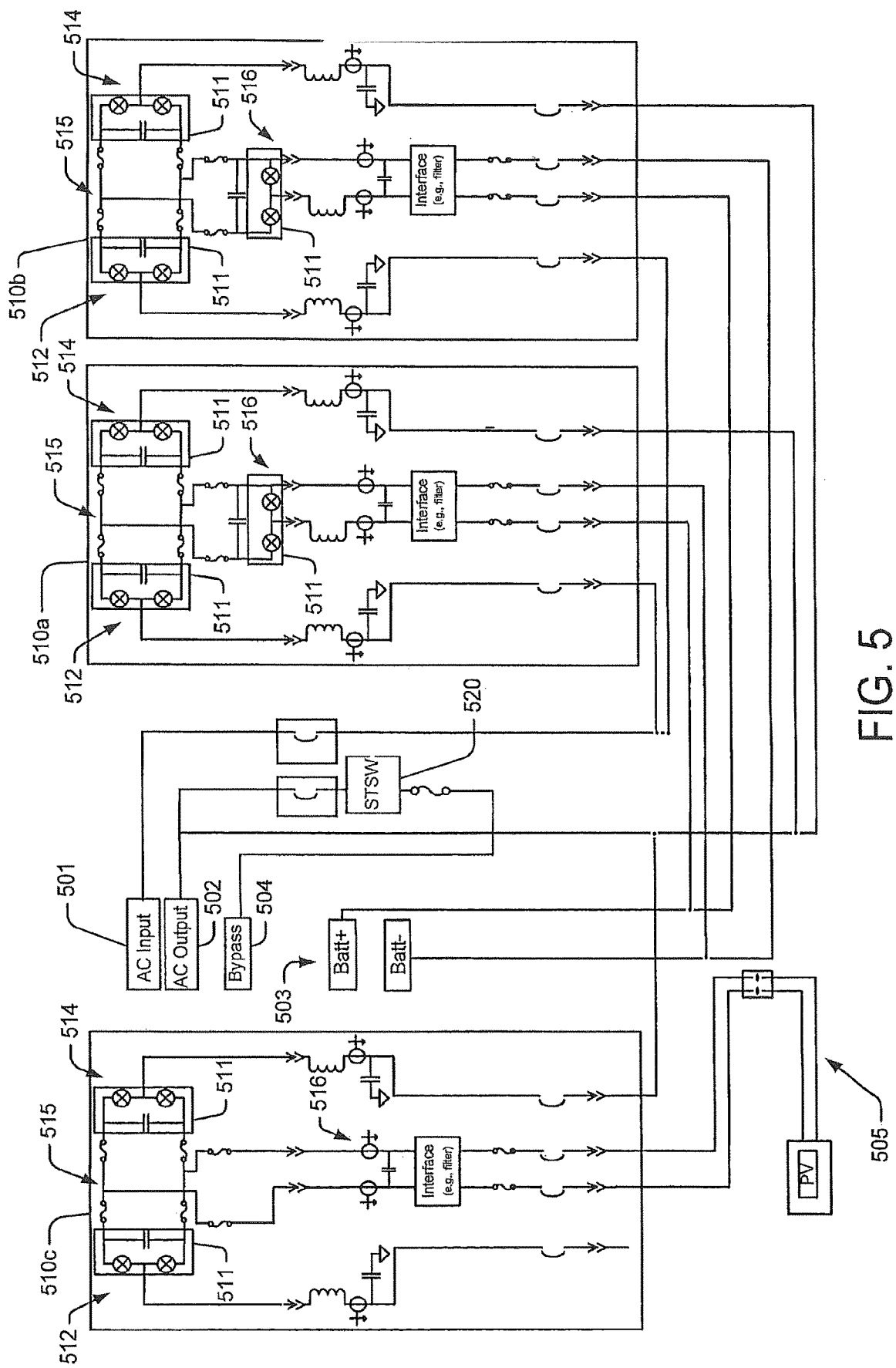
FIG. 5 is a schematic diagram illustrating configurations of various power conversion modules for a modular UPS system according to some embodiments of the inventive subject matter.

FIG. 5 illustrates a combination of power conversion modules 510a, 510b, 510c configured to provide a system such as the system 400 of FIG. 4. The modules 501a, 510b, 510c each comprise a first converter unit 512 and a second converter unit 514 coupled by DC buses 515, as well as a DC bus interface unit 516 that may be used for coupling to a battery or other power source (e.g., ultracapacitor, fuel cell, compressed air storage unit, flywheel, etc.). The first converter units 512, the second converter units 514 and the DC bus interface units 516 each include circuitry wherein active switching units 511 may be installed to realize half-bridge circuits. The modules 510a, 510b, 510c may also include inductors, capacitors, current sensors, contactors and fuses.

The first and second modules 510a, 510b are configured to operate as paralleled UPSs, with the first converter units 512 configured to operate as rectifiers coupled to an AC input bus 501 and the second converter units 514 configured to operate as inverters coupled to an AC output bus 502. The DC bus interface units 516 of the first and second modules 510a, 510b are configured to provide DC/DC converters coupled to battery buses 503.

A third module 510c is configured to provide an interface for connection of a photovoltaic (PV) power source via a PV bus 505. The second converter unit 514 of the third module 510c is configured to operate as an inverter, output-paralleled with the first and second modules 510a, 510b at the AC output bus 502. The first converter unit 512 of the third module is inactive, e.g., it may be operationally deactivated or active devices and passive components thereof may be depopulated. As shown, active components may be depopulated from the DC bus interface unit 516 of the third module 510c to allow a direct connection of the DC buses 515 thereof to the PV bus 505.

A bypass circuit including a static switch 520 is also provided. The static switch 520 is coupled to a bypass bus 504, which may be connected to the same AC source as the AC input bus 501. The modular configuration illustrated in FIG. 5 provides for use of common power conversion modules while supporting a degree of independence (e.g., isolation) of the PV source from the DC buses 515 of the first and second modules 510a, 510b, which are operated as UPSs.

Figure 6:
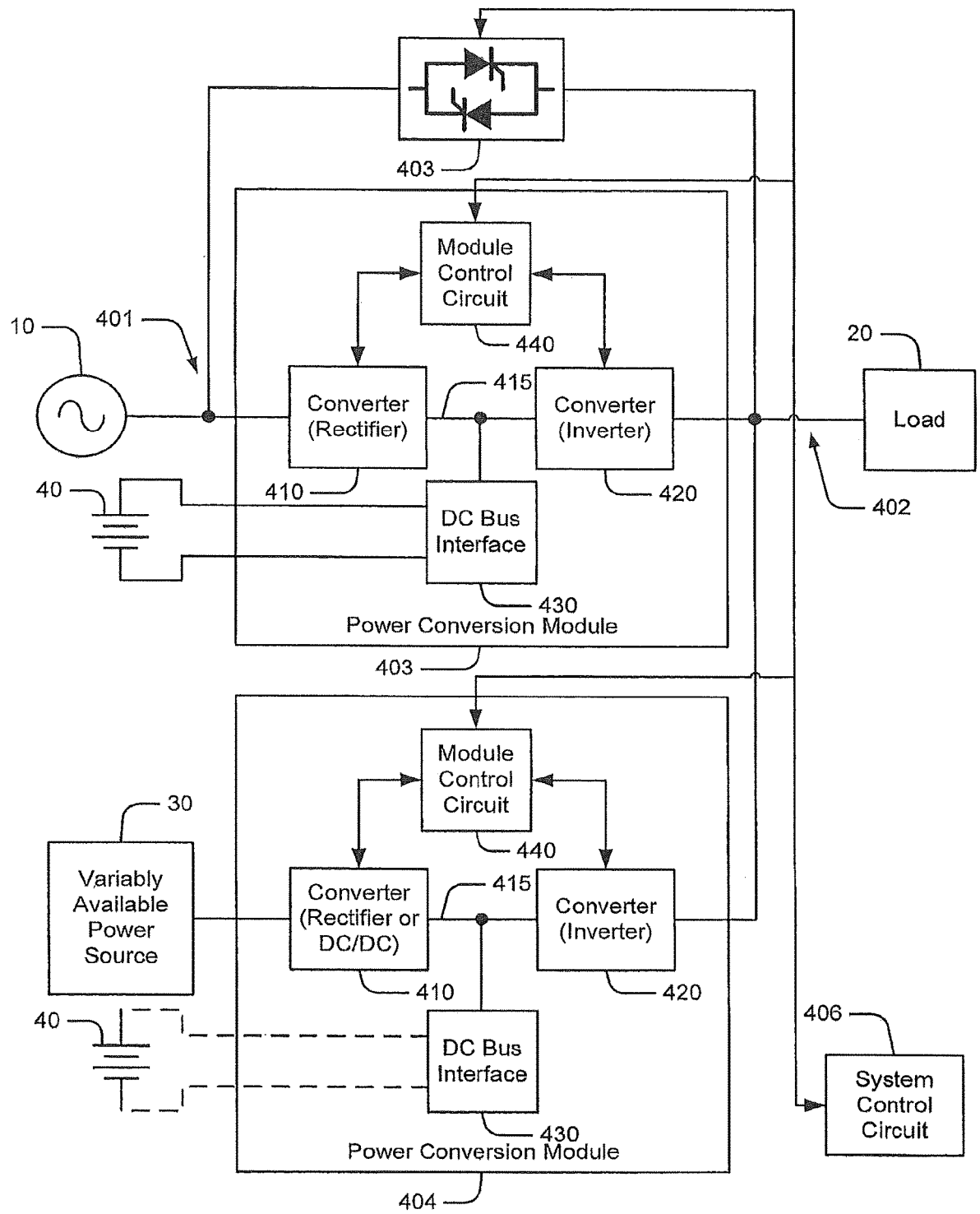
FIG. 6 is a schematic diagram illustrating a modular UPS system according to further embodiments of the inventive subject matter.

FIG. 6 illustrates a modular UPS system 600 according to further embodiments of the inventive subject matter. The system 600 uses first and second modules 403, 404 as shown in FIG. 4, except that the module 404 is configured to provide power from a variably available power source 30 via a first converter unit 410 of the second module 404, rather than via the DC bus interface unit 430. Depending on the nature of the variably available power source 30, the first converter unit 410 of the second module 404 may be operated as a rectifier or as a DC/DC converter. The bus interface unit 430 may be used for connection of one or more additional batteries 40.

Figure 7:
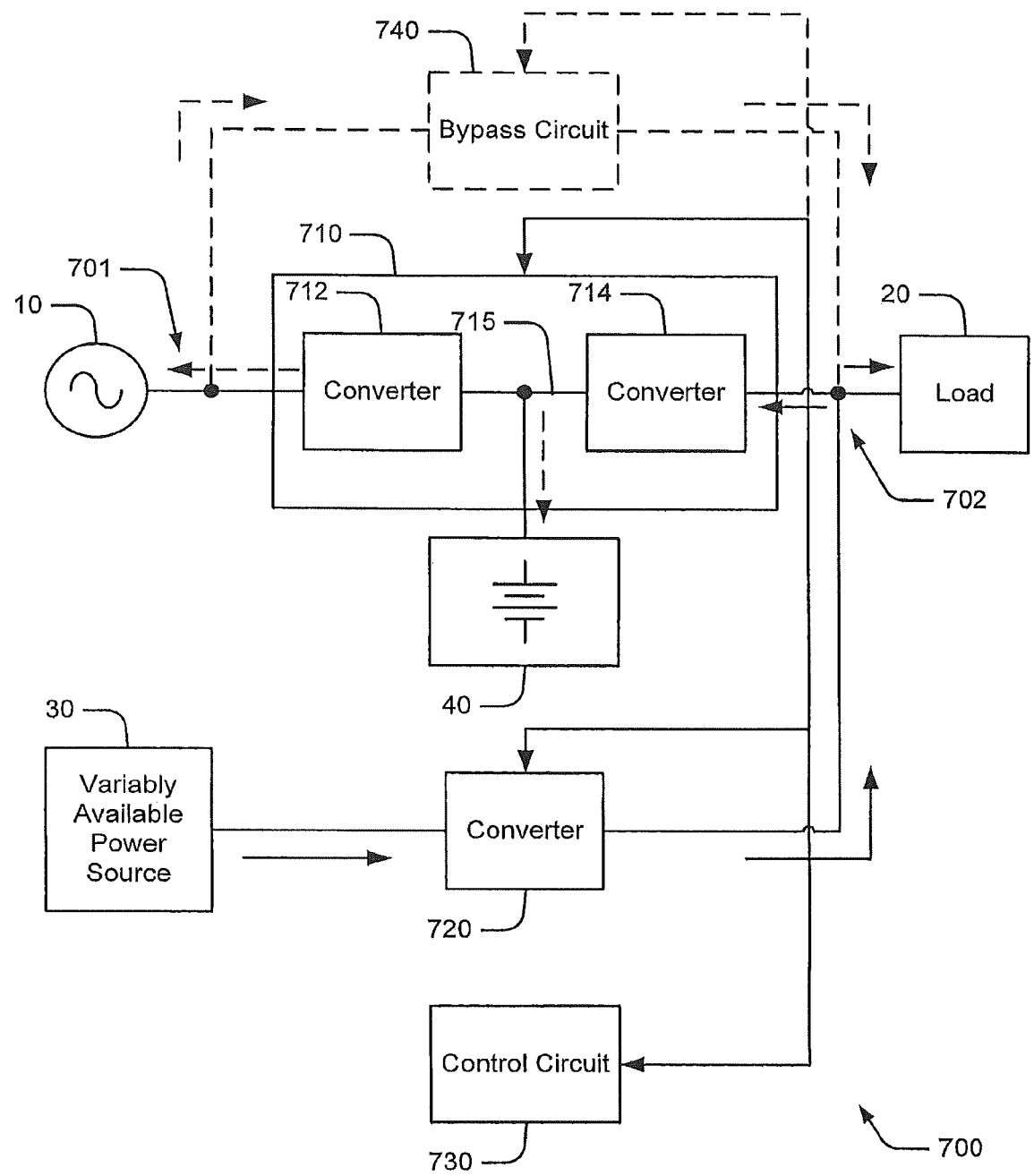
FIG. 7 is a schematic diagram illustrating operations of a UPS system according to some embodiments of the inventive subject matter.

According to further embodiments of the inventive concept, apparatus along the lines discussed above may also be used to deliver power from a variably available power source, such as a solar or wind power generator, to power storage device (e.g., a battery) of a UPS system and/or to a utility or similar AC source. For example, FIG. 7 illustrates a UPS system 700 that includes a UPS circuit 710 including a first converter circuit 712 and a second converter circuit 714, coupled by a DC link 715. An auxiliary power source 40, e.g., one or more batteries, may be coupled to the DC link 715. A first port of the first converter circuit 712 is coupled to a first port 701 of the UPS system 700, and a second port of the second converter circuit 714 is coupled to a second port 702 of the UPS system 700. The UPS circuit 710 is configured to provide uninterruptible power to a load 20 coupled to the second port 702 from an AC power source 10 (e.g., a utility source and/or local generator) coupled to the first port 701 and from the auxiliary power source 40, which may provide power in the event of a failure of the AC source 10. The UPS system 700 may also include a bypass circuit 740 (e.g., a static switch), which may be used to bypass the UPS circuit 710 to provide power directly from the AC power source 10 to the load 20, which may support maintenance and high-efficiency modes of operation. It will be appreciated that the UPS system 700 may be a single-phase or multiphase (e.g., three-phase) system.

The UPS system 700 further comprises a third converter circuit 720, coupled between the second port 702 and a variably available power source 30, such as a solar or wind power source. A control circuit 730 is operatively associated with the UPS circuit 710 and the converter circuit 720 (and, optionally, the bypass circuit 740) and is configured to cooperatively control the UPS circuit 710 and the converter circuit 720 to selectively transfer power to the load 20 from the AC power source 10 and the variably available power source 30. As further illustrated, the control circuit 730 may also be configured to control the UPS circuit 710 and the third converter circuit 720 to support power transfer from the variably available power source 30 to the auxiliary power source 40 and/or to the AC power source 10. For example, when the output of the variably available power source 30 exceeds the needs of the load 20, excess power may be provided to charge the auxiliary power source 40 and/or to provide power back to the AC power source 10. Such power transfer may be controlled (e.g., prioritized) based on any of a number of factors. For example, such power transfer may depend on the state (e.g., capacity) of the auxiliary power source 40, utility rates, and the like. For example, excess power generated by the variably available power source 30 may be more advantageously provided to the AC source 10 during peak load times at favorable utility buy-back rates, rather than using such power to charge a battery or other auxiliary source at peak demand times. The auxiliary power source 30 may instead be recharged from the AC power source 10 and/or the variably-available power source 30 at lower rates during non-peak times. Such power transfer operations may be dependent (e.g., optimized) on other factors, such as UPS system availability, current battery capacity, load level and/or load criticality.

Figure 8:
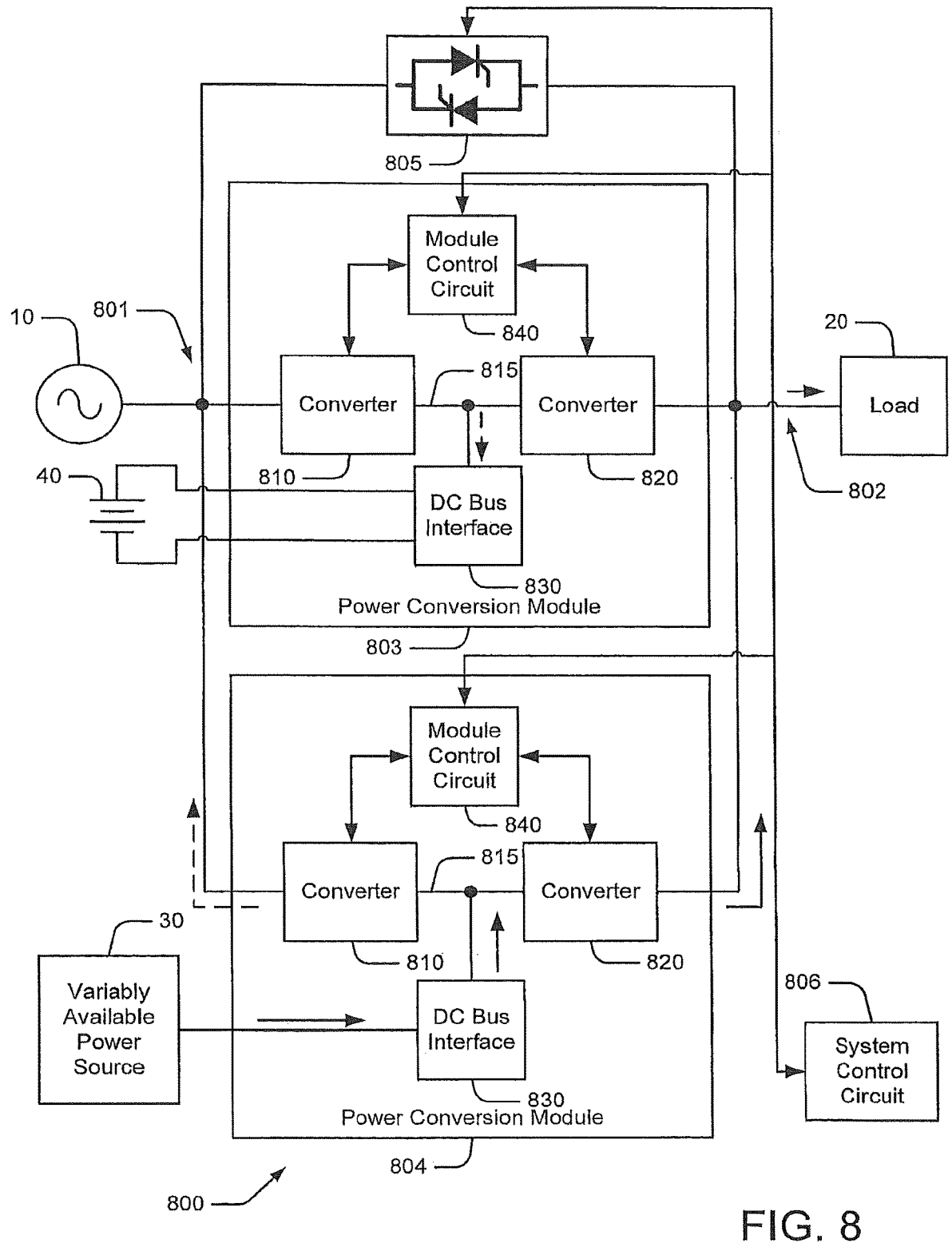
FIG. 8 is a schematic diagram illustrating a UPS system according to further embodiments of the inventive subject matter.

According to further embodiments, modular UPS arrangements may be used to similarly support varied power transfers. FIG. 8 illustrates a modular UPS system 800 that includes a first port 801 configured to be coupled to an AC power source 10 and a second port 802 configured to be coupled to a load 20. The UPS system 800 further includes first and second power conversion modules 803, 804 having a common architecture, including a first converter unit 810 and a second converter unit 820 coupled by a DC bus 815, a DC bus interface unit 830 and a module control circuit 840 configured to control the first converter unit 810, the second converter unit 820 and/or the DC bus interface unit 830. A system control circuit 806 controls interoperation of the first and second power conversion modules 803, 804 and a bypass circuit 805.

The first power conversion module 803 is configured to provide a UPS function. In particular, the first module 803 is configured to operate the first converter unit 810 as a rectifier to produce a DC voltage on the DC bus 815 from the AC power source 10. The first module 803 is further configured to operate the second converter unit 820 as an inverter to produce an AC voltage at the second port 802. The DC bus interface unit 830 of the first module 803 provides an interface to one or more batteries 40, which may be used to provide auxiliary power in the event of a failure of the AC power source 10. The second power conversion module 804 is configured to provide an interface to a variably available power source 30 (e.g., wind, solar, tidal, etc.), with the variably available power source 30 coupled to the DC bus 815 using the DC bus interface unit 830. The second converter unit 820 of the second power conversion module 804 may be operated as an inverter to provide power from the variably available power source 30 to the load 20. The second converter unit 820 of the first power conversion module 803 may also be used as a rectifier to transfer power from the variably available power source 30 (via the second converter unit 820 of the second power conversion module) in the event, for example, that power produced by the variably available power source 30 exceeds the requirements of the load 20. The first power conversion module 803 may further be used to transfer power to the AC power source 10 from the variably available power source 30 in a manner similar to that discussed above with reference to FIG. 7. As further illustrated, the first converter unit 810 of the second power conversion module 804 may also be operated as an inverter to more directly transfer power from the variably available power source to the AC power source 10. Further embodiments may include another auxiliary power source (e.g., battery) coupled to the DC bus 815 of the second power conversion module 804, such that the second power conversion module 804 may be used to provide additional UPS capacity in parallel with the first power conversion module 803 and/or to provide standby redundant UPS capacity to back up the first power conversion module 803.

In the drawings and specification, there have been disclosed exemplary embodiments of the inventive subject matter. Although specific terms are employed, they are used in a generic and descriptive sense only and not for purposes of limitation, the scope of the inventive subject matter being defined by the following claims.

That which is claimed:

1. A system, comprising:
a first uninterruptible power supply (UPS) configured to selectively couple a load to a first power source and a second power source;
a second UPS comprising a converter circuit configured to be coupled to the load in parallel with the first UPS and to selectively provide power to the load from a third power source and a fourth power source; and
a control circuit configured to control the first UPS and the converter circuit to transfer power from the third power source to the first power source via a power transfer path including the converter circuit and the first UPS.

2. The system of claim 1, wherein the first UPS and the second UPS comprise respective first and second UPS modules having a common architecture.

3. The system of claim 1, wherein the first power source comprises a utility power source, wherein the second power source comprises an energy storage device, wherein the third power source comprises a variably available power source, and wherein the fourth power source comprises an energy storage device.

4. The system of claim 3, wherein the variably available power source comprises a wind-powered source or a solar-powered source.

5. The system of claim 1, wherein the first power source comprises a utility power source, wherein the second power source comprises an energy storage device, and wherein the third power source comprises a variably available power source.

6. The system of claim 5, wherein the variably available power source comprises a wind-powered source or a solar-powered source.

7. A system, comprising:
a first UPS module configured to selectively couple a load to first power source and a second power source;
a second UPS module configured to be coupled to the load in parallel with the first UPS module and to selectively provide power to the load from a third power source and a fourth power source; and
a control circuit configured to control the first UPS module and the second UPS module to transfer power from the third power source to the first power source via a power transfer path including the second UPS module and the first UPS module.

8. The system of claim 7, wherein the first UPS module and the second UPS module have a common architecture.

9. The system of claim 7, wherein the first power source comprises a utility power source, wherein the second power source comprises an energy storage device, and wherein the third power source comprises a variably available power source.

10. The system of claim 9, wherein the variably available power source comprises a wind-powered source or a solar-powered source.

11. The system of claim 7, wherein the first power source comprises a utility power source, wherein the second power source comprises an energy storage device, wherein the third power source comprises a variably available power source, and wherein the fourth power source comprises an energy storage device.

12. A method of operating a system that includes a first UPS configured to selectively couple a load to first power source and a second power source and a second UPS comprising a converter circuit configured to be coupled to the load in parallel with the UPS and to selectively provide power to the load from a third power source and a fourth power source, the method comprising:
controlling the first UPS and the converter circuit to transfer power from the third power source to the first power source via a power transfer path including the converter circuit and the first UPS.

13. The method of claim 12, wherein the first UPS and the second UPS comprise respective first and second UPS modules having a common architecture.

14. The method of claim 12, wherein the first power source comprises a utility power source and wherein the third power source comprises a wind-powered source or a solar-powered source.

* * * * *

UNITED STATES PATENT AND TRADEMARK OFFICE
CERTIFICATE OF CORRECTION

| | |
|---|---|
| PATENT NO. | : 11,056,908 B2 |
| APPLICATION NO. | : 16/266190 |
| DATED | : July 6, 2021 |
| INVENTOR(S) | : Johnson, Jr. et al. |

It is certified that error appears in the above-identified patent and that said Letters Patent is hereby corrected as shown below:

On the Title Page

(73) Assignee: Please correct Assignee to read -- Eaton Intelligent Power Limited (IE) --

Signed and Sealed this
Third Day of May, 2022

*Katherine Kelly Vidal*

Katherine Kelly Vidal
*Director of the United States Patent and Trademark Office*